Dec. 16, 1952     E. A. WALLING     2,621,614
ICE CREAM SCOOP
Filed Sept. 18, 1950     2 SHEETS—SHEET 1
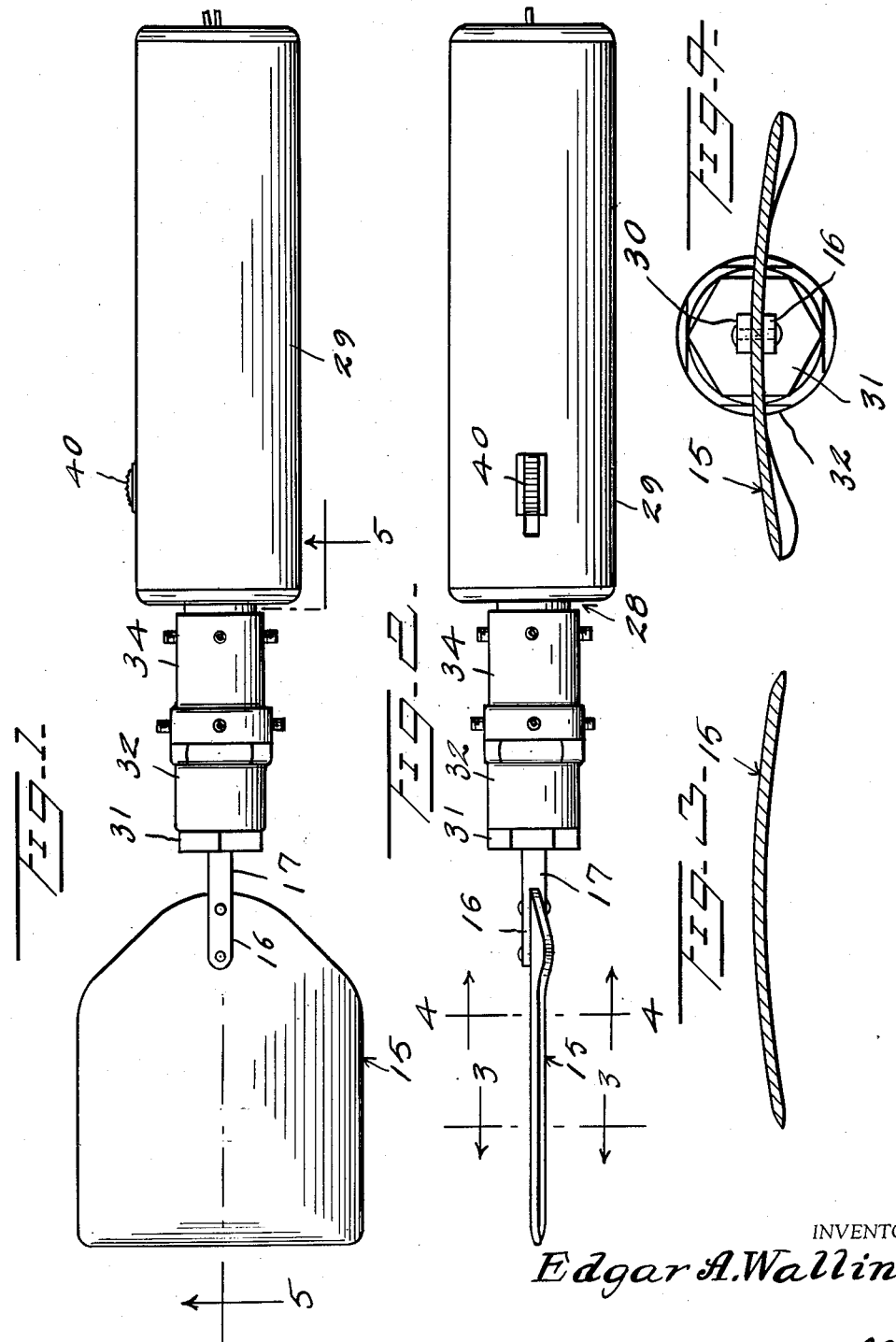
INVENTOR
*Edgar A. Walling*
BY *Kimmel & Crowell*
ATTORNEYS

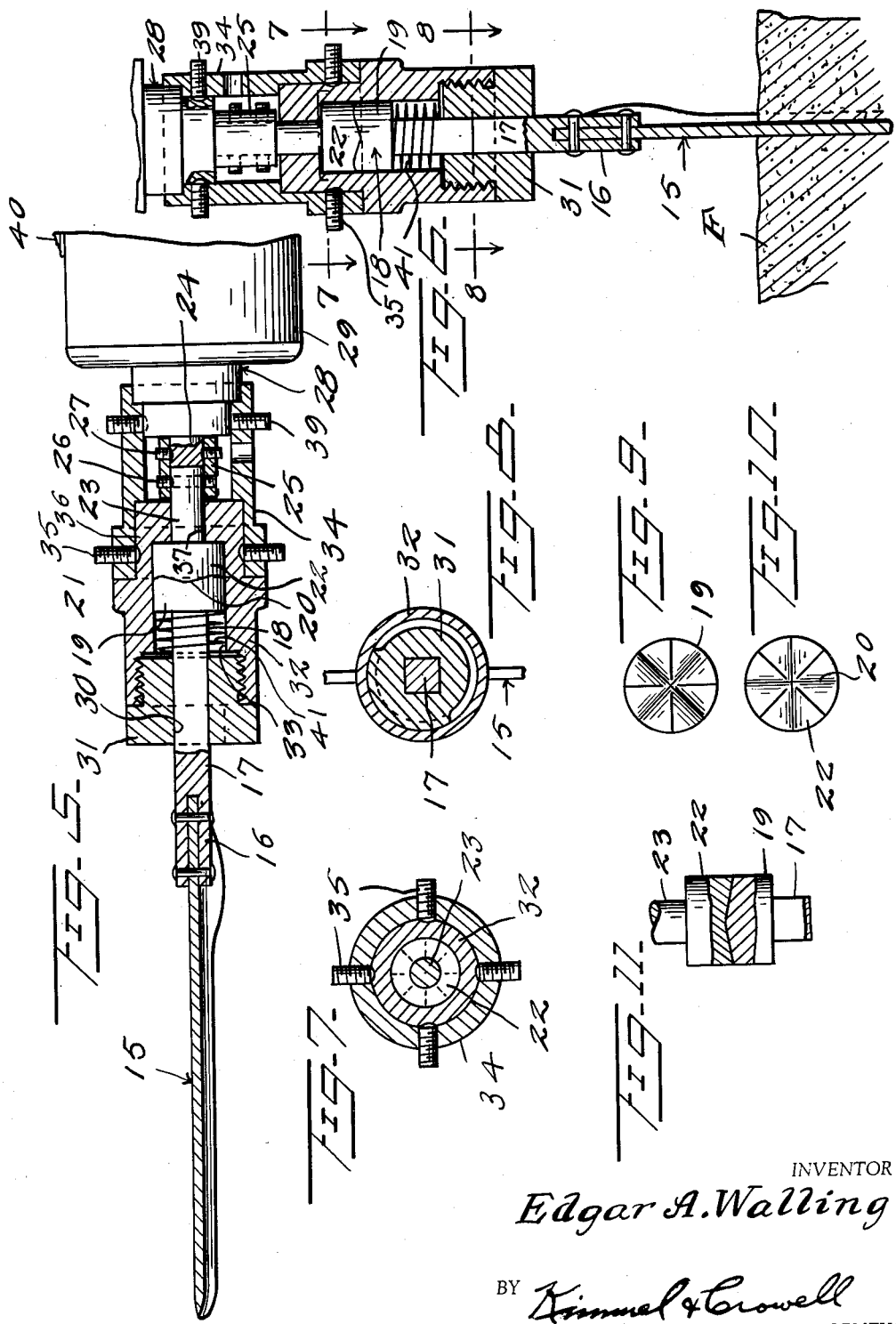

Patented Dec. 16, 1952

2,621,614

UNITED STATES PATENT OFFICE 2,621,614

ICE CREAM SCOOP

Edgar A. Walling, Keego Harbor, Mich.

Application September 18, 1950, Serial No. 185,424

1 Claim. (Cl. 107—48)

This invention relates to an electrically operated ice cream scoop.

An object of this invention is to provide a scoop for removing ice cream from a container which is so constructed that the scoop may be readily extended or forced into the ice cream with the latter in a relatively hard condition. In removing ice cream from containers by means of a conventional manual scoop it is very difficult to force the scoop into the hard or frozen cream.

It is, therefore, an object of this invention to provide an ice cream scoop or spade which includes an electric agitator for agitating the scoop in an endwise direction to thereby provide for the ready insertion of the scoop into the cream irrespective of the hardened condition of the latter.

Another object of this invention is to provide in combination a scoop or spade for removing frozen cream or edibles from a container and an electrically operated agitating means for effecting endwise movement of the scoop or tool to thereby facilitate the insertion of the tool into the frozen edible.

A further object of this invention is to provide an electrically operated device of this kind wherein the tool may be varied as to its configuration so that ice cream or frozen edibles of different kinds may be removed without undue manual presure being applied to the tool.

With the above and other objects in view, my invention consists in the arrangement, combination and details of construction disclosed in the drawings and specification, and then more particularly pointed out in the appended claim.

In the drawings:

Figure 1 is a detail plan view of an electrically operated ice cream scoop constructed according to an embodiment of this invention.

Figure 2 is a detail side elevation of the device.

Figure 3 is a sectional view taken on the line 3—3 of Figure 2.

Figure 4 is a sectional view taken on the line 4—4 of Figure 2.

Figure 5 is a fragmentary sectional view taken on the line 5—5 of Figure 1.

Figure 6 is a view similar to Figure 5, but showing the tool in operative position.

Figure 7 is a sectional view taken on the line 7—7 of Figure 6.

Figure 8 is a sectional view taken on the line 8—8 of Figure 6.

Figure 9 is an end elevation of the inner tool agitating member.

Figure 10 is an end elevational view of the outer agitating member.

Figure 11 is a fragmentary side elevation partly in section showing the agitating members in operating position.

Referring to the drawings the numeral 15 designates generally a tool designed for removing frozen edibles from a container and in the present instance the tool 15 is formed of a transversely arcuate blade which is secured between the bifurcations 16 of a polygonal stem or shank 17. The stem 17 has fixed on the inner end thereof a vibrating or agitating head generally designated as 18. The agitating head 18 comprises a round body 19 which is formed on the inner end thereof with radially disposed radial undulations or cam surface 20. The undulations 20 form cam surfaces which are complementary to radial undulations or cam surface 21 formed on the outer end of a rotary agitating head 22. The rotary agitating head 22 has extended inwardly therefrom a stud shaft or shank 23 which is coupled to a rotary motor shaft 24 by means of a cylindrical coupling sleeve 25. The coupling sleeve 25 is secured to the stud 23 by fastening means 26, and sleeve 25 is secured to the shaft 24 by fastening means 27. A spring 41 normally holds head 19 against head 22.

The motor shaft 24 extends through a bushing 28 which projects from the forward end of an electric motor 29. The motor 29 is elongated so as to not only provide a means for rotating head 22, but also to provide a handle for the scoop 15. The polygonal shank 17 is slidable through a polygonal opening 30 which is formed in a threaded plug 31 which is threaded into the outer end of a coupling body or guide member 32. The body 32 is formed with a guide central bore 33 within which the agitating head 19 is slidable and the agitating head 22 is also rotatable within the bore 33.

A sleeve 34 is secured by fastening means 35 to a reduced inner end 36 of the body 32, and the inner end of the body 32 is formed with a counterbore 37 within which the stud 23 is rotatable. The coupling member 34 telescopes over the bushing 28 and is secured thereto by fastening means 39. The motor 29 has a switch 40 mounted on the forward end thereof so that the motor can be operated or cut off at will when held in one hand.

In the use and operation of this device the tool 15 which may be a transversely arcuate blade or a dipping cup or the like will normally engage the agitating member 22 under the tension of spring 41. When the blade 15 is pressed into the frozen edible indicated at F in Figure 6, the pressure on the blade 15 with agitating member 22 rotating at a relatively rapid rate will axially agitate and cause endwise vibrations on the blade 15 which result in a hammer effect on the blade so that the blade 15 will be driven into the frozen edible.

With a device as hereinbefore described the blade 15 may be projected or driven into the frozen edible irrespective of the hardness of the edible so that the desired amount of the edible may be easily and quickly removed without undue strain on the part of the user. Where the edible is relatively soft the edible can be removed without agitation of the blade 15 by disconnecting the motor 29 through the medium of the switch 40.

What is claimed is:

An ice cream scoop comprising an electric motor having a bushing at one end and a rotary shaft extending through said bushing, a sleeve releasably fixed to said bushing and extending outwardly beyond said rotary shaft, a guide member releasably fixed to and extending axially from said sleeve, said guide member having a central guide bore and a counterbore, an agitating head fixed to said motor rotary shaft and disposed in the central guide bore of said guide member for rotation with respect thereto, said agitating head having a shank extending through said counterbore, means for releasably fixing said shank to said motor shaft, a blade member having a polygonal shank fixed thereto, a guide plug threaded into said guide member and having a polygonal bore through which said polygonal shank is slidable but non-rotatable, a second agitating head carried by said polygonal shank and axially slidable in the central guide bore, a compression spring surrounding the polygonal shank of said blade and positioned between the plug and the second agitating head to urge the second agitating head toward the first agitating head, said second agitating head thereby being axially aligned with the first agitating head and both of said heads being confined within and guided by the central guide bore of said guide member, said agitating heads respectively having opposing radially undulated cam surfaces engaging each other, the cam surface of the first agitating head being operable over the cam surface of the second agitating head, whereby said blade shank and the blade member upon operation of the electric motor will be axially agitated.

EDGAR A. WALLING.

REFERENCES CITED

The following references are of record in the file of this patent:

UNITED STATES PATENTS

| Number | Name | Date |
|---|---|---|
| 1,215,439 | Wagner | Feb. 13, 1917 |
| 1,574,788 | Brueseke | Mar. 2, 1926 |
| 1,588,832 | Young | June 15, 1926 |
| 1,759,842 | Fossa | May 27, 1930 |
| 1,825,072 | Keller | Sept. 29, 1931 |
| 2,407,785 | Hoover | Sept. 17, 1946 |
| 2,463,387 | Hoover | Mar. 1, 1949 |
| 2,484,471 | Shinn | Oct. 11, 1949 |
| 2,534,943 | Bergeson | Dec. 19, 1950 |